July 31, 1962  B. N. WALLIS  3,047,255
ENGINE MOUNTING FOR SWEPT-WING AEROPLANES
Filed Dec. 18, 1959  3 Sheets-Sheet 1

INVENTOR
BARNES NEVILLE WALLIS

ATTORNEYS

July 31, 1962     B. N. WALLIS     3,047,255
ENGINE MOUNTING FOR SWEPT-WING AEROPLANES
Filed Dec. 18, 1959     3 Sheets-Sheet 3

INVENTOR
Barnes Neville Wallis
Moves Nolte and Nolte
ATTORNEYS

3,047,255
ENGINE MOUNTING FOR SWEPT-WING AEROPLANES

Barnes N. Wallis, Effingham, England, assignor to Vickers-Armstrongs (Aircraft) Limited, Westminster, England, a company of Great Britain
Filed Dec. 18, 1959, Ser. No. 860,512
2 Claims. (Cl. 244—55)

The present invention has for its object to provide a form of engine/wing mounting which will be suitable for use in cases where the wings are adjustable in sweep and where the propulsive motors are jet-engines housed in pods which project to a considerable extent fore and aft of the mounting. It has been found that when engine pods are supported at the distance above or below the wing which is the most suitable from considerations of aerodynamic efficiency and structural economy, they require a range of free angular movement when adjusted for pitch or roll control which, in the swept condition, cannot be achieved without interference with the wing surface.

According to this invention, this disadvantage is avoided by incorporating in the engine/wing mounting two alternative pivots, both having axes parallel to the OY axis of the aircraft, at positions respectively adjacent the leading and trailing edges of the wing when swept forward, the arrangement being such that rotation of the engine pod for pitch or roll control takes place about one or other of said pivots, as selected, to permit such movement without interference between the wing and the engine pod.

Figure 1:
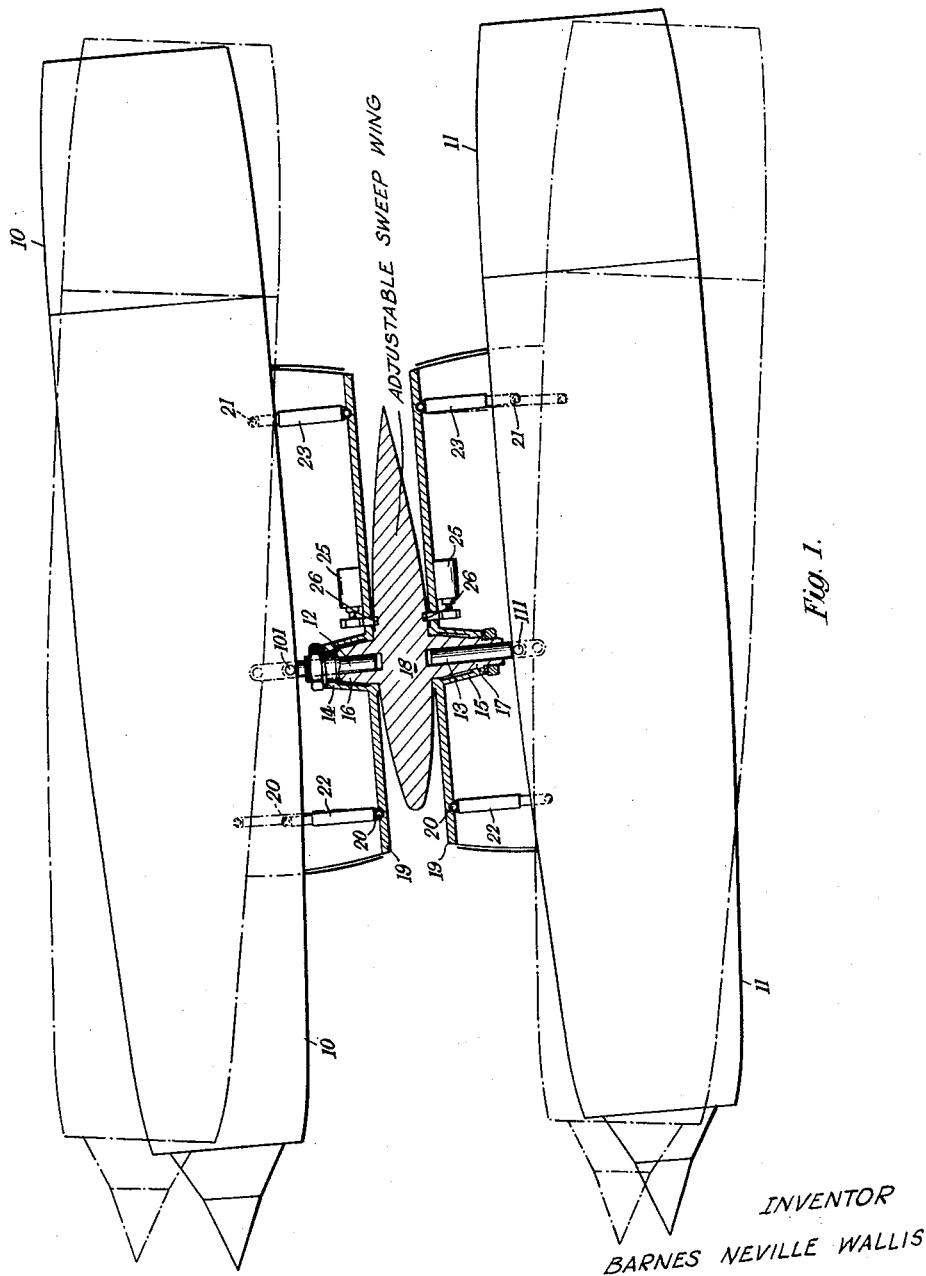
Figure 2:
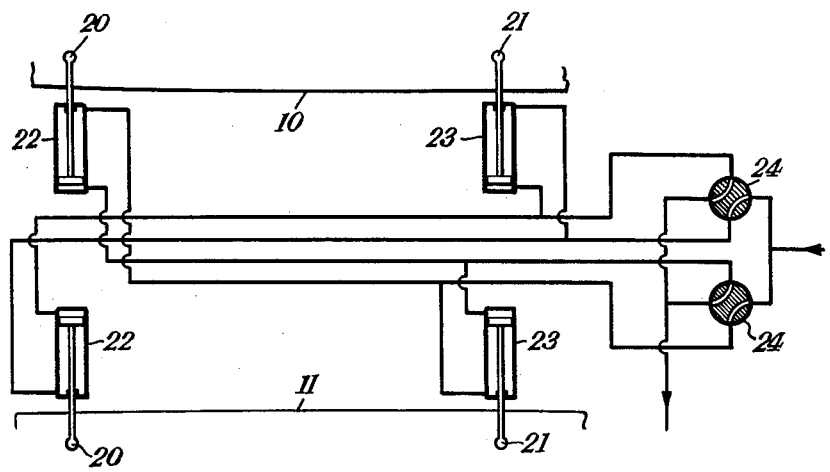
Figure 3:
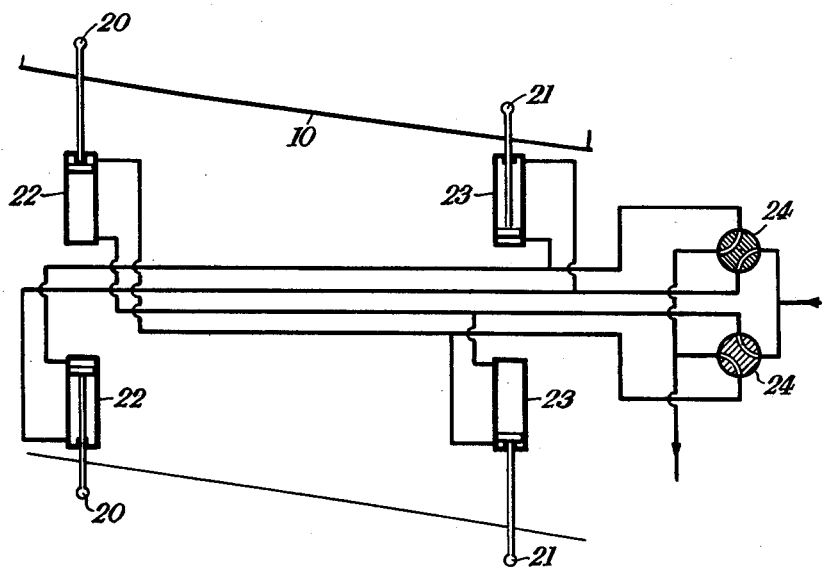
Figure 4:
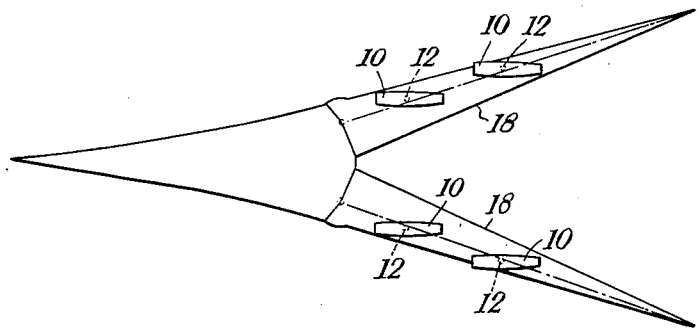
Figure 6:
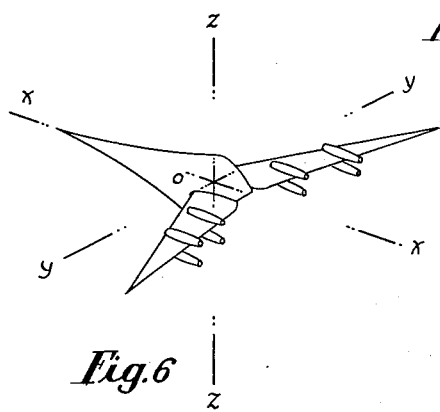
Figure 5:
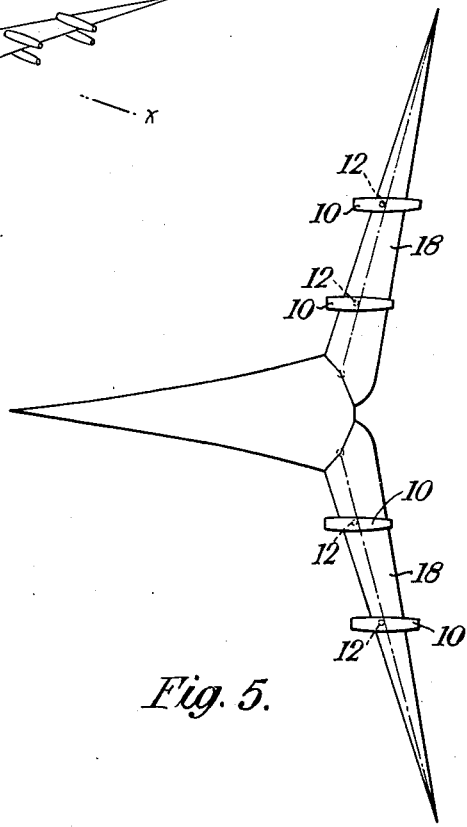

An embodiment of the invention, as applied to an aeroplane in which each propulsion unit comprises two individual jet-engines respectively disposed above and beneath the wing, is hereinafter described with reference to the accompanying drawings in which FIG. 1 is a longitudinal elevation of the engine units, showing the wing in section along a chordal plane, FIGS. 2 and 3 are diagrams of the hydraulic control circuit for the engine jacks, FIGS. 4 and 5 are diagrammatic plan views of an aeroplane having the present invention applied to the mounting of the wings. FIG. 4 shows the aeroplane with the wings outspread in a low speed position and FIG. 5 shows the aeroplane with the wings swept aft in a high speed position, and FIG. 6 is a perspective view of a typical aircraft showing the orientation of the OX, OY and OZ axes.

In the drawing the reference numerals 10 and 11 indicate the two engine pods, respectively supported upon the extremities of two co-axial stub-shafts 12, 13 which are rotatably supported within tubular pylons 14, 15, mounted upon bearing elements 16, 17 which are fixed to the structure of the wing 18 so as to extend upwardly and downwardly therefrom. Said stub-shafts 12, 13 are rotatable about their common axis, and their mounting provides for a limited degree of axial separating movement from a neutral position in order that they may accommodate the pitch control movement of the engine pods 10, 11 as hereinafter described. The outer extremity of each stub-shaft 12, 13 terminates in a pivotal connection 101, 111 with bracket on the engine so that the latter is capable of tilting movement on the stub-shaft about a transverse horizontal axis. The pylons 14, 15 constitute the means through which the engine thrust is transmitted from the stub-shaft to the wing structure for the propulsion of the aircraft.

Mounted externally on each pylon 14, 15 there is a beam 19 (hereinafter termed a "jack-beam") which is capable of rotation about the axis of the pylon. Each jack-beam 19 is a structure of streamline planform, extending parallel to the longitudinal axis of the engine pod to points 20, 21 which, when the wing is swept forward, are respectively located approximately above or below the leading and trailing edges of the wing. At said points 20, 21 the jack-beam is connected to the adjacent engine-pod 10 or 11 by hydraulic jacks 22, 23 by pivots having axes parallel to the OY axis of the aircraft.

FIGS. 2 and 3 of the drawings show the hydraulic control circuit of the several jacks 22, 23 all of which occupy a fully retracted position when the engine pods are in the neutral condition shown in FIG. 2. To tilt the leading end of the engine 10 upwardly about its pivot 21 and the after end of the engine 11 downwardly about its pivot 20, the cocks 24 are adjusted to apply pressure to the cylinders of the upper jack 22 and lower jack 23, the opposite ends of the lower jack 22 and the upper jack 23 being pressurised to hold them in the retracted position (FIG. 3). Conversely, to tilt the after end of the engine 10 upwardly about its pivot 20 and the leading end of the engine 11 downwardly about its pivot 21, the cocks 24 are reversed.

Thus, the pivotal connections 20, 21 of each jack to the relative engine pod constitute two alternative pivots about which that engine pod can be tilted, and the arrangement is such that the appropriate jack and the opposite pivot are brought into use according to the direction in which it is desired to tilt the engine pod. In every case the tilting movement takes place about a pivot axis which is so situated with respect to the wing 18 that interference between the latter and the engine pod cannot occur.

Adjustment in yaw is obtained by means of motors 25 which are mounted near the ends of the jack-beams 19 and geared to part-circular racks 26 fixed on the wing structure, actuations of the motors 25 serving to rotate the whole engine unit about an axis parallel to the OZ axis of the aircraft, the direction of rotation being dependent upon the selective control of the motors.

What I claim as my invention and desire to secure by Letters Patent is:

1. An airplane comprising a body, a pair of wings mounted thereon with a pivotal movement of sweep with respect to said body, each of said wings including at least one jet engine in a pod, mounting means securing said engine to said wing, said mounting means including a pylon mounted on the wing in association with each jet engine pod, a stub shaft rotatably mounted in each pylon, a pivotal connection between each engine pod and the relative stub shaft to permit movement of the engine about an axis parallel to the OY axis of the aircraft, a jack-beam mounted on each pylon for rotatable movement about an axis parallel to the OZ axis of the aircraft, a hydraulic jack connecting each end of each engine pod to the relative jack-beam by a pivot joint of which the axis is parallel to said OY axis, and a means for selectively operating the jack system in the manner herein described.

2. An airplane comprising a body, a pair of wings mounted thereon with pivotal movement of sweep with respect to said body, each of said wings including a pair of pods, each containing an individual jet engine disposed respectively above and beneath the wing, a pylon mounted on the topside and a pylon mounted on the bottomside of the wing, a stub shaft rotatably mounted in each pylon, the two stub shafts being co-axial and extending respectively upwardly and downwardly from the wing, a pivotal connection between each engine pod and the relative stub shaft to permit movement of the engine about an axis parallel to the OY axis of the aircraft, a jack-beam mounted on each pylon for rotatable movement about an axis parallel to the OZ axis of the aircraft, a hydraulic jack connecting each end of each engine pod to the relative jack beam by a pivot joint of which the axis is parallel to said OY axis, and a means for selectively operating the jack system in the manner herein described.

References Cited in the file of this patent

UNITED STATES PATENTS

| | | |
|---|---|---|
| 2,969,938 | Wallis | Jan. 31, 1961 |

FOREIGN PATENTS

| | | |
|---|---|---|
| 367,799 | Italy | Feb. 2, 1939 |
| 1,092,559 | France | Nov. 10, 1954 |
| 211,429 | Australia | Nov. 14, 1957 |
| 1,193,146 | France | Apr. 27, 1959 |